Patented Nov. 12, 1935

2,020,932

UNITED STATES PATENT OFFICE 2,020,932

TREATMENT OF SODIUM HYDROXIDE

Robert E. Burk and Everett C. Hughes, Cleveland, Ohio, assignors to The Standard Oil Company (Ohio), Cleveland, Ohio, a corporation of Ohio No Drawing. Application February 20, 1933, Serial No. 657,679

3 Claims. (Cl. 23—184)

Solutions of sodium hydroxide which have been employed for washing mercaptan-containing hydrocarbon distillates such as gasoline, kerosene, etc., while not used up in the sense of lack of caustic soda, are loaded up and contaminated by mercaptides. If these could be eliminated, the solutions could be available for further use. In accordance with the present invention, it now becomes possible to treat such sodium hydroxide as to purify it for desired usages.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The caustic soda solution which contains mercaptides, resulting from any such contamination, and as occurring notably in practice in sodium hydroxide solutions which have been applied for washing volatile hydrocarbon distillates, such as gasoline, kerosene, etc., is, in accordance with the present invention, treated with sulphur, such as to break up the sodium mercaptide, and allow the mercaptide radical thereof to be transferred into an organic compound and be eliminated in a suitable organic solvent. The general type of action occurring may be illustrated by the equation

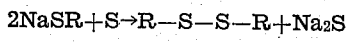
$$2NaSR + S \rightarrow R-S-S-R + Na_2S$$

By bringing the initial material into reaction with the sulphur simultaneously with a suitable organic selective solvent for the resultant organic mercaptan compounds, the latter may be readily eliminated from the mixture. The $Na_2S$ forming stays in solution in the aqueous component, or separates out in a settling tank, depending upon the concentration of the sodium hydroxide solution. With a suitably adjusted concentration, or by sharp cooling in the case of concentrations as low for instance as around 11 per cent, the sodium sulphide may be so eliminated, for purification desired for some usages. Where it is not necessary to secure the elimination of residual sodium sulphide, this may of course be left in the sodium hydroxide solution by appropriate control of the NaOH concentration.

As selective solvent for taking up the mercaptan radicals freed by the breaking up of the sodium mercaptides, hydrocarbon liquids may be employed, ordinarily desirably a naphtha. The sulphur is desirably brought into the reaction field in the form of a solution, and preferably the solvent which is to carry sulphur in may also be conveniently employed as the selective solvent to carry the final mercaptan compounds out. For instance, by treating the mercaptan-contaminated sodium hydroxide solution with a solution of sulphur in a naphtha, the sodium mercaptides are decomposed, and the mercaptan radicals go over into the solvent or naphtha as organic compounds, and by suitable decantation such component can be separated from the sodium hydroxide solution.

As an illustrative example: An aqueous solution of sodium hydroxide of about 11 per cent which is loaded up with mercaptides from washing gasoline, is subjected to treatment by intimate admixture of a nearly saturated solution of sulphur in naphtha, the proportion of the naphtha being about 100 per cent to the volume of the sodium hydroxide solution being treated. After thorough stirring and admixture for several minutes, the liquid is allowed to settle into layers, and the naphtha solution is separated off. The sodium hydroxide solution is then further allowed to stand in a settling tank. By a final filtration if necessary, the sodium hydroxide solution is ready for use as such, or if desired it may be evaporated to produce solid sodium hydroxide.

By reason of the general availability and low cost of reagents employed, the process of the present invention lends itself particularly advantageously to general usage, and it may be operated separately or in conjunction variously with more or less continuous type of associated operations.

Other modes of applying the principle of the invention may be employed, change being made as regards the details described, provided the steps stated in any of the following claims, or the equivalent of such, be employed.

We therefore particularly point out and distinctly claim as our invention:—

1. A process of purifying aqueous sodium hydroxide solutions containing mercaptides, which comprises washing the mercaptide-containing sodium hydroxide solution with sulphur and an organic solvent, immiscible with sodium hydroxide solution and in which both sulphur and the reaction product between sulphur and the mercaptide are soluble, and separating the organic solution from the aqueous sodium hydroxide solution.

2. A process of purifying aqueous sodium hydroxide solutions containing mercaptides, which comprises washing the mercaptide-containing sodium hydroxide solution with a solution of sulphur and an organic solvent, immiscible with sodium hydroxide solution and in which both sulphur and the reaction product between sulphur and the mercaptide are soluble, and separating the organic solution of sulphur from the aqueous sodium hydroxide solution.

3. A process of purifying aqueous sodium hydroxide solutions containing mercaptides, which comprises washing the mercaptide-containing sodium hydroxide solution with a concentrated solution of sulphur and a hydrocarbon solvent, immiscible with sodium hydroxide solution and in which both sulphur and the reaction product between sulphur and the mercaptide are soluble, and separating the hydrocarbon solution of sulphur from the aqueous sodium hydroxide solution.

ROBERT E. BURK.
EVERETT C. HUGHES.